United States Patent
Xu et al.

(10) Patent No.: US 8,245,120 B2
(45) Date of Patent: Aug. 14, 2012

(54) POWER REDUCED QUEUE BASED DATA DETECTION AND DECODING SYSTEMS AND METHODS FOR USING SUCH

(75) Inventors: Changyou Xu, Fremont, CA (US); Shaohua Yang, Santa Clara, CA (US); Hao Zhong, San Jose, CA (US); Nils Graef, Milipitas, CA (US); Ching-Fu Wu, Milipitas, CA (US)

(73) Assignee: LSI Corporation, Milpitas, CA (US)

( * ) Notice: Subject to any disclaimer, the term of this patent is extended or adjusted under 35 U.S.C. 154(b) by 944 days.

(21) Appl. No.: 12/270,713

(22) Filed: Nov. 13, 2008

(65) Prior Publication Data

US 2010/0070837 A1     Mar. 18, 2010

Related U.S. Application Data

(60) Provisional application No. 61/097,771, filed on Sep. 17, 2008.

(51) Int. Cl.
    *G06F 11/00*      (2006.01)
(52) U.S. Cl. ............... 714/799; 714/761; 714/758
(58) Field of Classification Search ............ 714/799, 714/761, 758, 762, 118, 128, 755
See application file for complete search history.

(56) References Cited

U.S. PATENT DOCUMENTS

| | | |
|---|---|---|
| 5,278,846 A | 1/1994 | Okayama et al. |
| 5,325,402 A | 6/1994 | Ushirokawa |
| 5,392,299 A | 2/1995 | Rhines et al. |
| 5,513,192 A | 4/1996 | Janku et al. |
| 5,612,964 A | 3/1997 | Haraszti |
| 5,642,365 A * | 6/1997 | Murakami et al. ............ 714/761 |
| 5,666,513 A * | 9/1997 | Whittaker ..................... 711/118 |

(Continued)

FOREIGN PATENT DOCUMENTS

WO    WO 2006/016751     2/2006

(Continued)

OTHER PUBLICATIONS

Eleftheriou, E. et al., "Low Density Parity Check Codes for Digital Subscriber Lines", Proc ICC 2002, pp. 1752-1757.

(Continued)

*Primary Examiner* — Fritz Alphonse
(74) *Attorney, Agent, or Firm* — Hamilton, DeSanctis & Cha

(57) ABSTRACT

Various embodiments of the present invention provide systems and methods for data processing. For example, a variable iteration data processing system is disclosed that includes a first detector, a second detector, a decoder and a unified memory buffer. An input data set is received by the first detector that performs a data detection and provides a first detected data set. The decoder receives a derivative of the first detected data set and performs a decoding operation that yields a decoded data set. In some cases, the derivative of the first detected data set is an interleaved version of the first detected data set. The decoded data set is written to a unified memory buffer. The first decoded data set is retrievable from the unified memory buffer and a derivative thereof is provided to the second detector. In some cases, the derivative of the decoded is a de-interleaved version of the decoded data set. The second detector is operable to perform a data detection on the derivative of the decoded data set and to provide a second detected data set that is written to the unified memory buffer.

33 Claims, 8 Drawing Sheets

U.S. PATENT DOCUMENTS

| | | | |
|---|---|---|---|
| 5,701,314 | A | 12/1997 | Armstrong et al. |
| 5,717,706 | A | 2/1998 | Ikeda |
| 5,844,945 | A | 12/1998 | Nam et al. |
| 5,898,710 | A | 4/1999 | Amrany |
| 5,923,713 | A | 7/1999 | Hatakeyama |
| 5,978,414 | A | 11/1999 | Nara |
| 5,983,383 | A | 11/1999 | Wolf |
| 6,005,897 | A | 12/1999 | McCallister et al. |
| 6,023,783 | A | 2/2000 | Divsalar et al. |
| 6,029,264 | A | 2/2000 | Kobayashi et al. |
| 6,041,432 | A | 3/2000 | Ikeda |
| 6,097,764 | A | 8/2000 | McCallister et al. |
| 6,216,251 | B1 | 4/2001 | McGinn |
| 6,266,795 | B1 | 7/2001 | Wei |
| 6,317,472 | B1 | 11/2001 | Choi et al. |
| 6,351,832 | B1 | 2/2002 | Wei |
| 6,377,610 | B1 | 4/2002 | Hagenauer et al. |
| 6,438,717 | B1 | 8/2002 | Butler et al. |
| 6,473,878 | B1 | 10/2002 | Wei |
| 6,625,775 | B1 | 9/2003 | Kim |
| 6,671,404 | B1 | 12/2003 | Kawatani et al. |
| 6,748,034 | B2 | 6/2004 | Hattori et al. |
| 6,757,862 | B1 | 6/2004 | Marianetti, II |
| 6,788,654 | B1 | 9/2004 | Hashimoto et al. |
| 6,810,502 | B2 | 10/2004 | Eidson et al. |
| 6,986,098 | B2 | 1/2006 | Poeppelman |
| 7,010,051 | B2 | 3/2006 | Murayama et al. |
| 7,047,474 | B2 | 5/2006 | Rhee et al. |
| 7,058,873 | B2 | 6/2006 | Song et al. |
| 7,093,179 | B2 | 8/2006 | Shea |
| 7,184,486 | B1 | 2/2007 | Wu et al. |
| 7,191,378 | B2 | 3/2007 | Eroz et al. |
| 7,203,887 | B2 | 4/2007 | Eroz et al. |
| 7,257,764 | B2 | 8/2007 | Suzuki et al. |
| 7,310,768 | B2 | 12/2007 | Eidson et al. |
| 2004/0098659 | A1 | 5/2004 | Bjerke et al. |
| 2005/0216819 | A1 | 9/2005 | Chugg et al. |
| 2005/0273688 | A1 | 12/2005 | Argon |
| 2006/0020872 | A1 | 1/2006 | Richardson et al. |
| 2006/0031737 | A1 | 2/2006 | Chugg et al. |
| 2006/0140311 | A1 | 6/2006 | Ashley et al. |
| 2006/0168493 | A1 | 7/2006 | Song et al. |
| 2006/0195772 | A1 | 8/2006 | Graef et al. |
| 2006/0248435 | A1 | 11/2006 | Haratsch |
| 2007/0011569 | A1 | 1/2007 | Casado et al. |
| 2007/0047635 | A1 | 3/2007 | Stojanovic et al. |
| 2007/0286270 | A1 | 12/2007 | Huang et al. |
| 2008/0049825 | A1 | 2/2008 | Chen et al. |
| 2008/0168330 | A1 | 7/2008 | Graef et al. |

FOREIGN PATENT DOCUMENTS

| | | |
|---|---|---|
| WO | WO 2006/091797 | 8/2007 |

OTHER PUBLICATIONS

Han and Ryan, "Pinning Techniques for Low-Floor Detection/Decoding of LDPC-Coded Partial Response Channels", 5th International Symposium on Turbo Codes &Related Topics, 2008.

Mohsenin et al., "Split Row: A Reduced Complexity, High Throughput LDPC Decoder Architecture", pp. 1-6, printed from www.ece.ucdavis.edu on Jul. 9, 2007.

Vasic, B., "High-Rate Low-Density Parity-Check Codes Based on Anti-Pasch Affine Geometries," Proc ICC 2002, pp. 1332-1336.

Vasic, B., "High-Rate Girth-Eight Codes on Rectangular Integer Lattices", IEEE Trans. Communications, vol. 52, Aug. 2004, pp. 1248-1252.

Yeo et al., "VLSI Architecture for Iterative Decoders in Magnetic Storage Channels", Mar. 2001, pp. 748-755, IEEE trans. Magnetics, vol. 37, No. 2.

Zhong et al., "Area-Efficient Min-Sum Decoder VLSI Architecture for High-Rate QC-LDPC Codes in Magnetic Recording", pp. 1-15, Submitted 2006.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Casado et al., Multiple-rate low-density parity-check codes with constant blocklength, IEEE Transations on Communications, Jan. 2009, vol. 57, pp. 75-83.

* cited by examiner

POWER REDUCED QUEUE BASED DATA DETECTION AND DECODING SYSTEMS AND METHODS FOR USING SUCH

CROSS REFERENCE TO RELATED APPLICATIONS

The present application claims priority to (is a non-provisional of) U.S. Pat. App. No. 61/097,771 entitled "Power Reduced Queue Based Data Detection and Decoding Systems and Methods for Using Such", and filed Sep. 17, 2008 by Xu et al. The entirety of the aforementioned application is incorporated herein by reference for all purposes.

BACKGROUND OF THE INVENTION

The present inventions are related to systems and methods for detecting and/or decoding information, and more particularly to systems and methods for performing iterative data decoding and/or detection.

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by any losses in data caused by various factors. In some cases, an encoding/decoding process is used to enhance the ability to detect a data error and to correct such data errors. As an example, a simple data detection and decode may be performed, however, such a simple process often lacks the capability to converge on a corrected data stream.

To heighten the possibility of convergence, various existing processes utilize two or more detection and decode iterations. Turning to FIG. 1, an exemplary prior art two stage data detection and decode circuit 100 is depicted. Two stage data detection and decode circuit 100 receives a data input 105 that is applied to a detector 110. A hard and soft output from detector 110 is provided to an LDPC decoder 115. Input 105 is fed forward via a buffer 130 to another detector 120. Detector 120 uses a soft output of LDPC decider 115 and input 105 to perform an additional data detection process. A hard and soft output from detector 120 is provided to an LDPC decoder 125 that performs a second decoding process and provides an output 135. Where the initial detection and decode provided by detector 110 and LDPC decoder 115 does not converge, the subsequent detection and decode provided by detector 120 and LDPC decoder 125 provide an additional opportunity to converge. Such an approach, however, requires two iterations for each input data set introduced as input 105. This may waste significant power and introduce unnecessary latency where the input is capable of converging in a single iteration. Further, in some cases two iterations is insufficient to result in a convergence. Thus, such an approach is both wasteful in some conditions and insufficient in other conditions.

Hence, for at least the aforementioned reasons, there exists a need in the art for advanced systems and methods for data processing.

BRIEF SUMMARY OF THE INVENTION

The present inventions are related to systems and methods for detecting and/or decoding information, and more particularly to systems and methods for performing iterative data decoding and/or detection.

Various embodiments of the present invention provide variable iteration data processing systems. Such systems include a first detector, a second detector, a decoder and a unified memory buffer. An input data set is received by the first detector that performs a data detection and provides a first detected data set. The decoder receives a derivative of the first detected data set and performs a decoding operation that yields a decoded data set. In some cases, the derivative of the first detected data set is an interleaved version of the first detected data set. The decoded data set is written to a unified memory buffer. The first decoded data set is retrievable from the unified memory buffer and a derivative thereof is provided to the second detector. In some cases, the derivative of the decoded is a de-interleaved version of the decoded data set. The second detector is operable to perform a data detection on the derivative of the decoded data set and to provide a second detected data set that is written to the unified memory buffer.

In some instances of the aforementioned embodiments, the unified memory buffer is further operable to provide the derivative of the second detected data set to the decoder via an input buffer and a multiplexer. In some such instances, the system further includes an interleaver that is operable to receive the first detected data set and to provide the derivative of the first detected data set to the decoder via the multiplexer.

In various instances of the aforementioned embodiments, the system further includes an output buffer. In such instances, the decoder is operable to provide the decoded data set to the output buffer when the decoded data set converges. A de-interleaver may be included that is operable to receive the decoded data set from the unified memory and to de-interleave the decoded data set. In some cases, the output of the decoder includes both a hard output and a soft output. In such cases, the output buffer may only receive the hard output.

Other embodiments of the present invention provide methods for processing a data input. The methods include providing a first detector and a second detector. A data detection is performed on an input data set using the first detector to generate a first detected data set. The first detected data set is interleaved and the first interleaved data set is decoded. The decoded data set is written to a unified memory buffer. The decoded data set may then be read from the unified memory buffer and de-interleaved to generate a de-interleaved data set. A data detection is performed on the de-interleaved data set that generates a second detected data set. The second detected data set is interleaved, and the second interleaved data set is written to the unified memory buffer. In some cases, the location to which the second interleaved data set is written is the same as that to which the decoded data set was originally written.

In various instances of the aforementioned embodiments, the decoded data set is a first decoded data set, and the methods further include decoding the second interleaved data set to generate a second decoded data set; determining whether the second decoded data set converged; and based at least in part on said determination of convergence, providing at least a portion of the second decoded data set to an output buffer. Other instances of the aforementioned embodiments of the present invention include: decoding the second interleaved data set to generate a second decoded data set; determining whether the second decoded data set converged; writing the second decoded data set to the unified memory buffer; de-interleaving the second decoded data set to generate a second de-interleaved data set; performing a data detection on the second de-interleaved data set to generate a third detected data set; interleaving the third detected data set to generate a third interleaved data set; and writing the third interleaved data set to the unified memory buffer. In some such cases, the third interleaved data set is written to the same location in the unified memory buffer that the first decoded data set was written.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for detecting and/or decoding information, and more particularly to systems and methods for performing iterative data decoding and/or detection.

Figure 1:
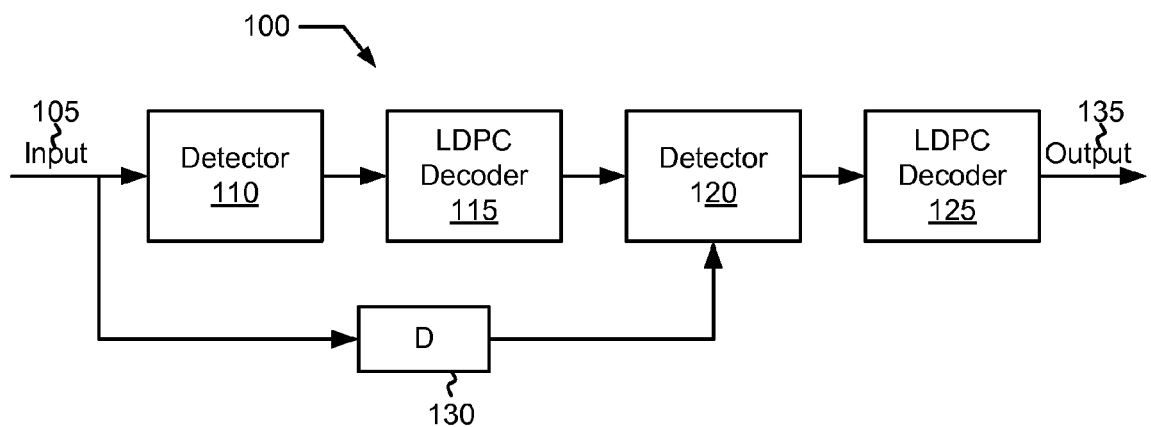
FIG. 1 depicts a prior art two stage data detection and decoding system.
Figure 2:
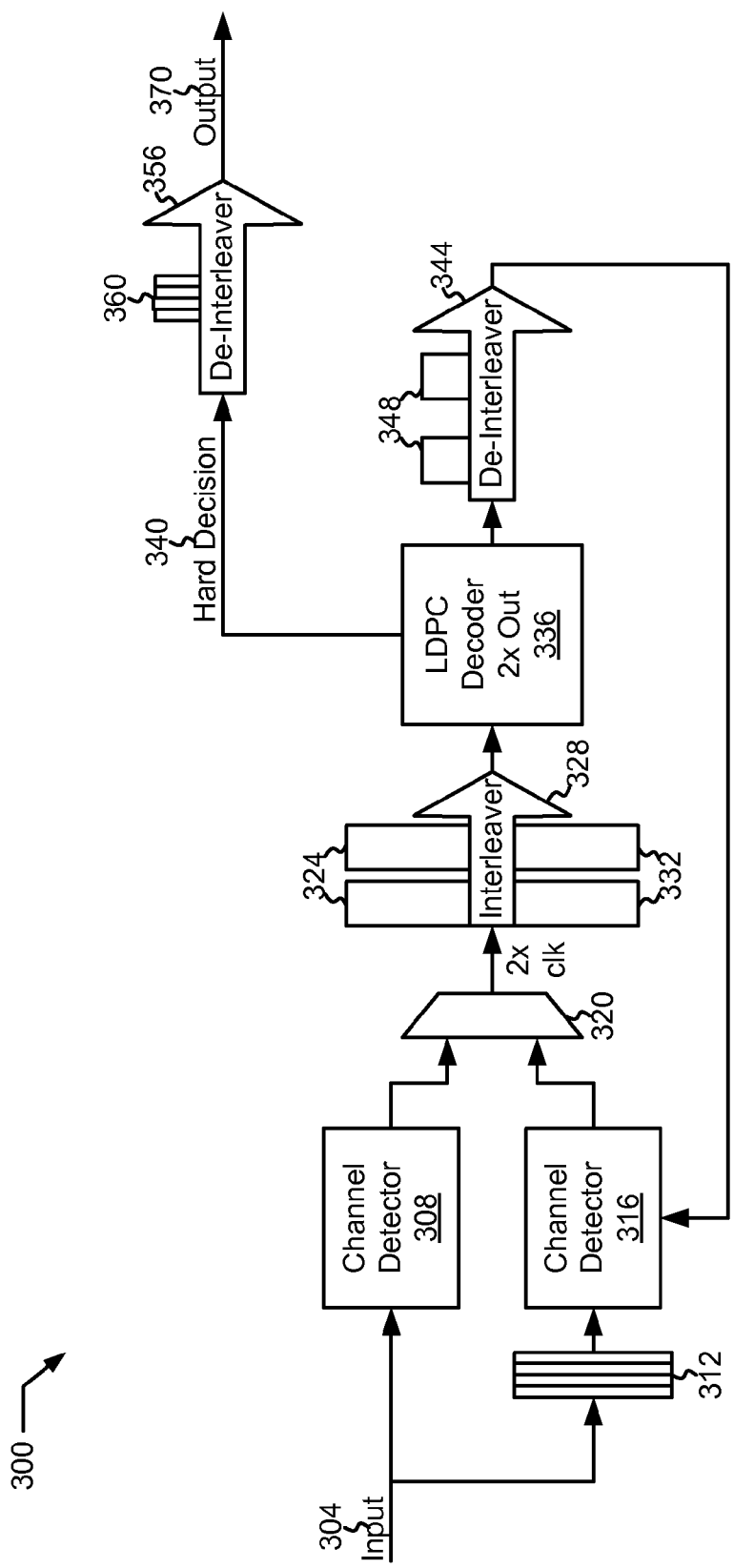
FIG. 2 depicts a queuing detection and decoding circuit without a unified memory.

In some implementations, a queuing detection/decoding circuits have been designed to include an input memory and a separate output memory servicing a secondary channel detector. An example of such a queuing detection/decoding circuit is included in U.S. patent application Ser. No. 12/114,462 entitled "Systems and Methods for Queue Based Data Detection and Decoding", and filed May 2, 2008 by Yang et al. The aforementioned patent application is assigned to an entity common hereto, and the entirety of the aforementioned patent application is incorporated herein by reference for all purposes. Turning to FIG. 2, one implementation of a queuing detection/decoding circuit 300 with separate input and output memories associated with a second channel detector is depicted. Queuing detection/decoding circuit 300 includes a data input 304 that is fed to a channel detector 308. Channel detector 308 may be any type of channel detector known in the art including, but not limited to, a soft output Viterbi algorithm detector (SOVA) or a maximum a posteriori (MAP) detector. In addition, data input 304 is provided to a input data buffer 312 that is designed to hold a number of data sets received from data input 304. The size of input data buffer 312 may be selected to provide sufficient buffering such that a data set input via data input 304 remains available at least until a first iteration processing of that same data set is complete and the processed data is available in a ping pong buffer 348 (i.e., a queuing buffer). Input data buffer 312 provides the data sets to a channel detector 316. Similar to channel detector 308, channel detector 316 may be any type of channel detector known in the art including, but not limited to, a SOVA detector or a MAP detector. channel detector 316 may be any type of channel detector known in the art including, but not limited to, a SOVA detector or a MAP detector.

The output of both channel detector 308 and channel detector 316 are provided to an interleaver circuit 328 via a multiplexer 320. Such outputs may be, for example, log likelihood ratio values. Interleaver circuit 328 interleaves the output of channel detector 308 and separately interleaves the output of channel detector 316 using two ping pong buffers 324, 332. One of the buffers in ping pong buffer 324 holds the result of a prior interleaving process of the output from channel detector 308 and is unloaded to an LDPC decoder 336, while the other buffer of ping pong buffer 324 holds a data set from channel detector 308 that is currently being interleaved. Similarly, one of the buffers in ping pong buffer 332 holds the result of a prior interleaving process of the output from channel detector 316 and is unloaded to LDPC decoder 336, while the other buffer of ping pong buffer 324 holds a data set from channel detector 316 that is currently being interleaved.

LDPC decoder 336 is capable of decoding one or more data sets simultaneously. As an example, LDPC decoder 336 may be designed to decode an interleaved data set from ping pong buffer 324, or an interleaved data set from ping pong buffer 332, or to decode interleaved data sets from ping pong buffer 324 and ping pong buffer 332 simultaneously. The decoded data is either provided as a hard decision output 340 and/or to one of the buffers in a buffer in a ping pong buffer 348. A de-interleaver circuit 344 de-interleaves the data in the ping-pong buffer 348 and provides it a an input to channel detector 316. The other buffer of ping pong buffer 348 holds a decoded data set currently being processed by LDPC decoder 336. Hard decision output 340 is provided to an output data buffer 360. The data in output data buffer 360 is ultimately de-iunterleaved using a de-interleaver circuit 356, and the output of de-interleaver circuit 356 is provided as an output 370.

In operation, a first data set is introduced via data input 304 to channel detector 308. Channel detector 308 performs its channel detection algorithm and provides both a hard output and a soft output to multiplexer 320. The hard and soft decision data passed via multiplexer 320 is interleaved using an interleaver circuit 328, and the interleaved data is written to one buffer of ping pong buffer 324. At the same time the detector output is written into the buffer, data from the another of the ping pong buffers 324, 328 is provided to LDPC decoder 336 where the decoding process is applied. Where the data converges, LDPC decoder 336 writes its output as hard decision output 340 to output data buffer 360 and the processing is completed for that particular data set. Alternatively, where the data does not converge, LDPC decoder 336 writes its output (both soft and hard) to ping pong buffer 348. As more fully described below, the scheduling guarantees that there is at least one empty buffer for holding this new set of data, and this strategy assures that each data input is guaranteed the possibility of at least two global iterations (i.e., two passes through a detector and decoder pair).

The data written to ping pong buffer 348 is fed back to channel detector 316 after being de-ineterleaved by de-interleaver 344. Channel detector 316 selects the data set that corresponds to the output in ping pong buffer 348 from input data buffer 312 and performs a subsequent data detection aided by the soft output data generated by LDPC decoder 336 fed back from ping pong buffer 348. By using the previously generated soft data for data maintained in input data buffer 312, channel detector 316 generally performs a subsequent channel detection with heightened accuracy. The output of this subsequent channel detection is passed to interleaver 328 via multiplexer 320. The data is written to one buffer of ping pong buffer 332, and interleaver 328 interleaves the data. The interleaved data is then passed to LDPC decoder 336 where it is decoded a second time. Similar to the first iteration, a decision is made as to whether the data converged or whether there is insufficient space in ping pong buffer 348 to handle the data. Where such is the case, LDPC decoder 336 writes its output as hard decision output 340 to output data buffer 360 and the processing is complete for that particular data set. Alternatively, where the data does not converge and there is sufficient buffer space in ping pong buffer 348 to receive an additional data set, writes its output (both soft and hard) to ping pong buffer 348 where it is passed back to channel detector 316 for a third pass. Sufficient space is defined in ping pong buffer 348 by having at least reserved space for the data set from the first detector and decoder after the data set from the second detector and decoder is written into the ping pong buffer.

It should be noted that, as an example, a first data set may be applied at data input 304 and that it takes a number of iterations to converge while all subsequent data sets applied at data input 304 converge on the first pass (i.e., on a single iteration). In such a case, the first data set may be processed a number of times (i.e., a number of iterations) that is limited by the amount of memory available in output data buffer 360. Once output data buffer 360 is full or once an ordered set of outputs are available, the most recent hard decision output corresponding to the first data set is provided as a hard decision output and de-interleaver 356 re-orders the outputs putting the first output in the first position. With this done, output data buffer 360 is de-interleaved by de-interleaver 356 and the results of the de-interleaving process are provided as output 370. In some embodiments of the present invention, de-interleaver 356 does not perform a re-ordering function and output data buffer 360 has a very limited size. In such a case, it is conceivable that a data set could be processed a very large number times (i.e., a large number of iterations) only limited by how long a recipient of output 370 is willing to wait for the data. As another example, it is possible that all data applied as data input 304 converges on its first pass. In such a case, channel detector 316, LDPC decoder 336 and/or de-interleaver 344 may be placed in a power saving mode to conserve power. As yet another example, it may be the case that all data sets applied at data input 304 fail to converge on the first pass (i.e., a single iteration). In such a case, all data sets would be iterated twice. It should also be noted that one or more additional channel detectors may be added along with additional space in ping pong buffers 324, 332, 348 that would facilitate more iterations in the situation where a significant number of closely located data sets fail to converge. In such cases, all data sets can be guaranteed to be decoded with number of iterations the same as the number of detectors.

Based on the disclosure provided herein, it will be appreciated that queuing detection/decoding circuit 300 allows for performance of a variable number of detection and decoding iterations depending upon the introduced data. Further, in some cases, considerable power savings may be achieved through use of queuing detection/decoding circuit 300. Yet further, in some cases, a faster LDPC decoder may be implemented allowing for an increased throughput where substantial first iteration data convergence exists as multiple iterations are not necessarily required. Yet further, by allowing results of LDPC decoder 336 to be reported out of order, upstream processing does not have to wait for the completion of downstream processing. Re-ordering of the out of order results may be done by queuing detection/decoding circuit 300 or by a downstream recipient of output 370.

Of note, queuing detection/decoding circuit 300 includes a ping pong buffer 332 separate from ping pong buffer 348. Various embodiments of the present invention redefine the data flow such that ping pong buffer 332 and ping pong buffer 348 can be unified. In such cases, similar performance can be achieved where the unified memory is equivalent to the larger of ping pong buffer 332 or ping pong buffer 348. Thus, at a maximum, the unified memory is half the size of the combined size of ping pong buffer 332 and ping pong buffer 348. This reduction in size provides various benefits including, but not necessarily limited to, a reduction in power consumption for the same performance and a reduction in physical area of a detection/decoding circuit. This savings in memory becomes more significant where code/sector section demands greater memory per unit of decoding. Table 1 provides some examples of memory sizes required to support a separate ping pong buffer 332 and ping pong buffer 348 based on different code/sector implementations.

TABLE 1

Exemplary Memory Requirements for Non-Unified Memory Implementations

| Code Type | Memory Configuration | Overall Memory Size |
| --- | --- | --- |
| Two Way Interleaving with Codeword Size 37 × 72 × 5 | 2 × 37 × 72 × 5 | 2 × 26640 = 53280 |
| Three Way Interleaving with Codeword Size 37 × 72 × 5 | 3 × 37 × 72 × 5 | 2 × 39960 = 79920 |
| Two Way Interleaving with Codeword Size 44 × 72 × 5 | 2 × 44 × 72 × 5 | 2 × 31680 = 63360 |
| Eight Way Interleaving with Codeword Size 34 × 72 × 5 | 8 × 34 × 72 × 5 | 2 × 97920 = 195840 |
| Six Way Interleaving with Codeword Size 44 × 72 × 5 | 6 × 44 × 72 × 5 | 2 × 95040 = 190080 |

Figure 3:
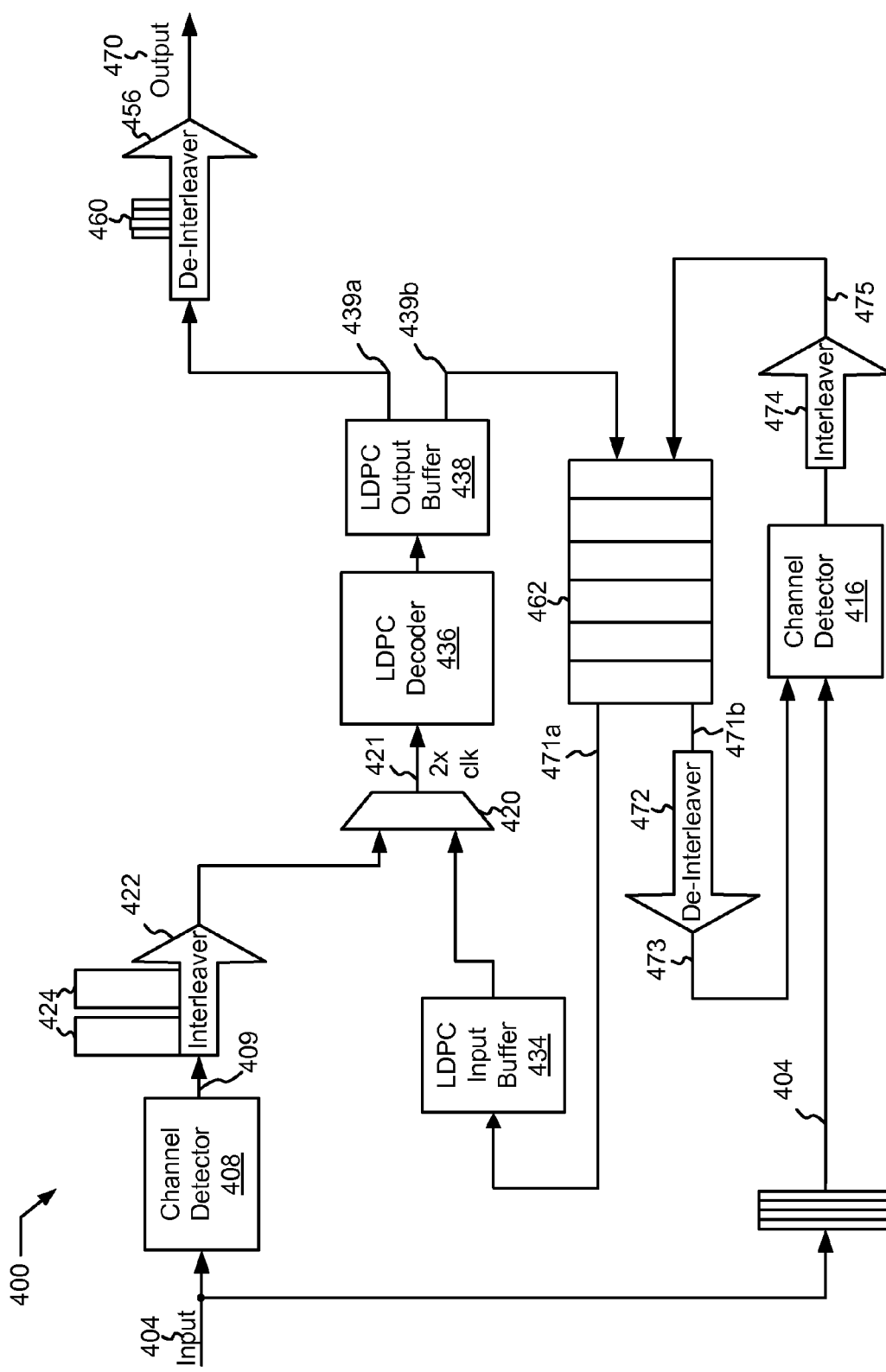
FIG. 3 depicts a queuing detection and decoding circuit utilizing a unified memory in accordance with one or more embodiments of the present invention.

Turning to FIG. 3, a queuing detection/decoding circuit 400 including a unified memory 462 is depicted in accordance with various embodiments of the present invention. Queuing detection/decoding circuit 400 includes a data input 404 that is fed to a channel detector 408. Channel detector 408 may be any type of channel detector known in the art including, but not limited to, a soft output Viterbi algorithm detector (SOVA) or a maximum a posteriori (MAP) detector. Based on the disclosure provided herein, one of ordinary skill in the art will recognize a variety of channel detectors that may be used in accordance with different embodiments of the present invention. In addition, data input 404 is provided to a memory buffer 412 that is designed to hold a number of data sets received from data input 404. The size of memory buffer 412 may be selected to provide sufficient buffering such that a data set input via data input 404 remains available at least until a first iteration processing of that same data set is complete and the processed data is available in unified memory 462 after a first decoding operation as more fully described below. Memory buffer 412 provides the data sets to a channel detector 416. Similar to channel detector 408, channel detector 416 may be any type of channel detector known in the art including, but not limited to, a SOVA detector or a MAP detector. Again, based on the disclosure provided herein, one of ordinary skill in the art will recognize a variety of channel detectors that may be used in accordance with different embodiments of the present invention.

The output of channel detector 408 is provided to an interleaver circuit 422 where it is interleaved and then stored to one buffer of a ping pong buffer 424. The other buffer of ping pong buffer may include previously interleaved data that is provided to an LDPC decoder 436 via a multiplexer 420. LDPC decoder 436 is capable of decoding two data sets in the same time that one data set takes to become available from interleaver circuit 422 and stored to ping pong buffer 424. As an example, LDPC decoder 436 may be designed to decode an interleaved data set from ping pong buffer 424, or to decode interleaved data sets from an LDPC input buffer 434. Thus, a multiplexer output 421 may be either supplied form LDPC input buffer 434 or from ping pong buffer 424. LDPC decoder 436 performs one or more local iterations on a given data set before providing decoded results to an LDPC output buffer 438. Once LDPC decoding is complete for the particular data set, the entire decoded data set (i.e., output 439) is transferred from LDPC output buffer 438 to a defined codeword location in unified memory 462. In addition, where the data set converged, the entire decoded data set is transferred to an output memory buffer 460 where it is maintained prior to being re-assembled with various other component parts of a codeword. Ultimately, the re-assembled codeword is pulled from output memory buffer 460, de-interleaved using a de-interleaver circuit 456 and provided as an output 470.

Where a data set does not converge after processing through LDPC decoder 436, the data set may be marked for another global iteration once a channel detector 416 becomes free to perform the iteration. Once channel detector 416 is free, the data set previously written from LDPC output buffer 438 to unified memory 462 is retrieved (i.e., output 471) and de-interleaved using a de-interleaving circuit 472. An output 473 of de-interleaving circuit 472 is provided to channel detector 416. Channel detector 416 also receives input 404 that corresponds in time with output 473 from memory buffer 412. Channel detector 416 performs a detection process on the data and provides its output to an interleaver circuit 474 that interleaves the received data and writes it back to unified memory 462. In some cases, interleaved data 475 is written to the same location that output 471 was taken from when the data was originally provided to de-interleaver circuit 472 and then to channel detector 416.

Once LDPC decoder 436 is free to perform a subsequent decode of interleaved data 475, it is pulled from unified memory 462 to an LDPC input buffer 434. From LDPC input buffer 434, the interleaved data is provided to LDPC decoder 436 via multiplexer 420. LDPC decoder 436 then performs one or more local iterations on the data and provides the result to LDPC output buffer 438. Similar to the first global iteration, where the data set converges, it is provided to output memory buffer 460 where it is maintained prior to being re-assembled with various other component parts of a codeword. Ultimately, the re-assembled codeword is pulled from output memory buffer 460, de-interleaved using a de-interleaver circuit 456 and provided as an output 470.

Similar to queuing detection/decoding circuit 300, queuing detection/decoding circuit 400 provides an ability to perform a variable number of global iterations on a given data set depending upon convergence and available memory. Further, in some cases, a faster LDPC decoder may be implemented allowing for an increased throughput where substantial first iteration data convergence exists as multiple iterations are not necessarily required. Yet further, by allowing results of LDPC decoder 436 to be reported out of order, upstream processing does not have to wait for the completion of downstream processing. Re-ordering of the out of order results may be done by queuing detection/decoding circuit 400 or by a downstream recipient of output 470. In addition, the use of unified memory 462 results in a reduction in required area and power consumption as the actual memory area is reduced.

TABLE 2

Exemplary Memory Requirements for Unified Memory Implementations

| Code Type | Memory Configuration | Overall Memory Size |
| --- | --- | --- |
| Two Way Interleaving with Codeword Size 37 × 72 × 5 | 2 × 37 × 72 × 5 | 1 × 26640 = 26640 |
| Three Way Interleaving with Codeword Size 37 × 72 × 5 | 3 × 37 × 72 × 5 | 1 × 39960 = 39960 |
| Two Way Interleaving with Codeword Size 44 × 72 × 5 | 2 × 44 × 72 × 5 | 1 × 31680 = 31680 |
| Eight Way Interleaving with Codeword Size 34 × 72 × 5 | 8 × 34 × 72 × 5 | 1 × 97920 = 97920 |
| Six Way Interleaving with Codeword Size 44 × 72 × 5 | 6 × 44 × 72 × 5 | 1 × 95040 = 95040 |

Queuing detection/decoding circuit 400 provides a queuing capability that allows for variable global iteration of multiple codewords where a global iteration includes a sequential detection and decoding process. The possibility of two global iterations is guaranteed, but not required. In queuing detection/decoding circuit 400, an input codeword may be initially processed using a MAP detector and a subsequent LDPC decoder. If the codeword does not converge, its soft information may be stored into the LDPC soft output (i.e., queuing buffer) memory, and this queued codeword can then be processed in a subsequent global iteration by a second detector and the LDPC decoder until it either converges or must be passed on as an output due to latency constraints or lack of memory. The subsequent processing continues until at least one of the following conditions holds: the LDPC decoder successfully decodes the codeword (i.e., all parity checks are satisfied); the queue memory is full, and the earlier queued codeword has to give way to the new coming codeword; and/or the queued codeword has been in the system for more than a maximum latency time. The maximum latency time is determined by the size of a hard decision buffer (i.e., an output buffer) if such is utilized (measured in number of codewords). When used as a reordering buffer, the smallest meaningful size is sufficient to hold two codewords. A decoding failure occurs when a codeword is pushed out into the hard-decision buffer before the LDPC decoding converges.

It should be noted that while a specific implementation of a queuing detection/decoding circuit is disclosed herein, that a number of other variations are possible in accordance with different embodiments of the present invention. For example, separate decoders may be implemented with each corresponding to respective channel detectors. Further, queuing detection/decoding circuit 400 is discussed generically using the phrases "codeword" and "data set" to represent the data being processed. In one particular implementation of the present invention, "component codewords" are the blocks processed by LDPC decoder 436. A codeword may be comprised of a number of component codewords that are each assembled in output memory buffer 460 prior to being de-interleaved and provided as output 470. Based on the disclosure provided herein, one of ordinary skill in the art will recognize a variety of other modifications that may be possible in accordance with one or more embodiments of the present invention.

Figure 4A:
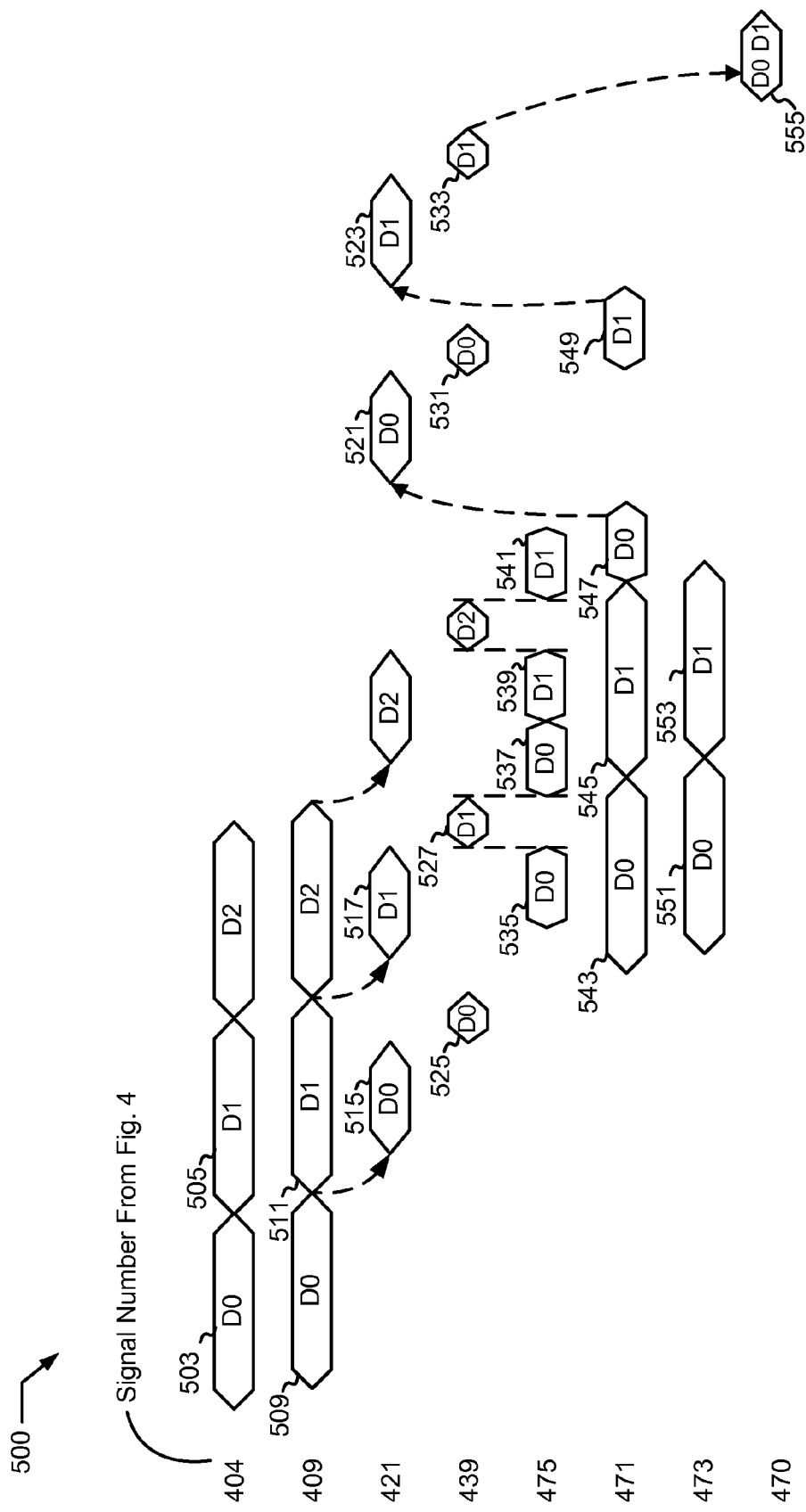
FIGS. 4a-4b are timing diagrams depicting exemplary operations of the queuing detection and decoding circuit of FIG. 3 in accordance with some embodiments of the present invention.

Turning to FIG. 4a, a timing diagram 500 shows an exemplary operation of queuing detection/decoding circuit 400 in accordance with one or more embodiments of the present invention. In this exemplary illustration, it is assumed that a codeword is divided into two component codewords (i.e., data sets D0 and D1), with each of the component codewords requiring two global iterations before converging. Following timing diagram 500, a series of data bits comprising a data set D0 are provided to channel detector 408 (designated 503). The received series of data bits is processed by channel detector 408 and output 409 is loaded into one buffer of ping pong buffer 424 (designated 509). Interleaver circuit 422 unloads the aforementioned buffer to LDPC decoder 436 (designated 515), and LDPC decoder 436 provides the results to LDPC output buffer 438, and the data in LDPC output buffer 438 is transferred to unified memory 462 (designated 525). Data set D0 is not transferred to output memory buffer 460 as it has not converged.

At the same time, a subsequent series of data bits (data set D1) are provided to channel detector 408 (designated 505) and channel detector 408 processes the newly received series of bits into the other buffer of ping pong buffer 424 (designated 511). Interleaver circuit 422 unloads the aforementioned buffer to LDPC decoder 436 (designated 517), and LDPC decoder 436 provides the results to LDPC output buffer 438, and the data in LDPC output buffer 438 is transferred to unified memory 462 (designated 527). Data set D1 is not transferred to output memory buffer 460 as it has not converged.

During the interim, data set D0 is retrieved from unified memory 460 (designated 543) and de-interleaved (designated 551). As the data set is de-interleaved, the de-interleaved output is loaded back into unified memory 462 (designated 535, 537). In some cases, the de-interleaved data set is loaded (designated 535, 537) back into the same location that it was originally retrieved from (designated 543). By doing so, there is no loss of performance attributable to the reduced memory when compared with the non-unified design discussed above in relation to FIG. 2. Of note, the transfer of data set D0 back to unified memory 462 is interrupted for a short period while data set D1 is written from LDPC output buffer 438 to unified memory 462 (designated 527).

After being written back to unified memory 462, data set D0 may subsequently be retrieved from unified memory 462 and transferred to LDPC input buffer 434 (designated 547). Data set D0 may then be pulled from LDPC input buffer 434 to LDPC decoder 436 where it goes through a second decoding process (designated 521). Once the decoding process is completed, data set D0 is written back to its same location in unified memory 462, and because it converged, it is also written to output memory buffer 460 (designated 531). As data set D0 converged, it is marked as unused in unified memory 462 freeing the location for use by a subsequent data set.

While the aforementioned process is ongoing, data set D1 is pulled from unified memory 462 (designated 545) and de-interleaved (designated 553). As the data set is de-interleaved, the de-interleaved output is loaded back into unified memory 462 (designated 539, 541). In some cases, the de-interleaved data set is loaded (designated 539, 541) back into the same location that it was originally retrieved from (designated 545). By doing so, there is no loss of performance attributable to the reduced memory when compared with the non-unified design discussed above in relation to FIG. 2. Again, the transfer of data set D1 back to unified memory 462 is interrupted for a short period while a subsequent data set is written from LDPC output buffer 438 to unified memory 462.

After being written back to unified memory 462, data set D1 may subsequently be retrieved from unified memory 462 and transferred to LDPC input buffer 434 (designated 549). Data set D1 may then be pulled from LDPC input buffer 434 to LDPC decoder 436 where it goes through a second decoding process (designated 523). Once the decoding process is completed, data set D1 is written back to its same location in unified memory 462, and because it converged, it is also written to output memory buffer 460 (designated 533). As data set D1 converged, it is marked as unused in unified memory 462 freeing the location for use by a subsequent data set.

With all of the component codewords of the original codeword available in output memory buffer 460, the data sets are pulled from output memory buffer 460 and assembled in the proper order. The assembled codeword is then de-interleaved and provided as output 470 (designated 555).

Figure 4B:
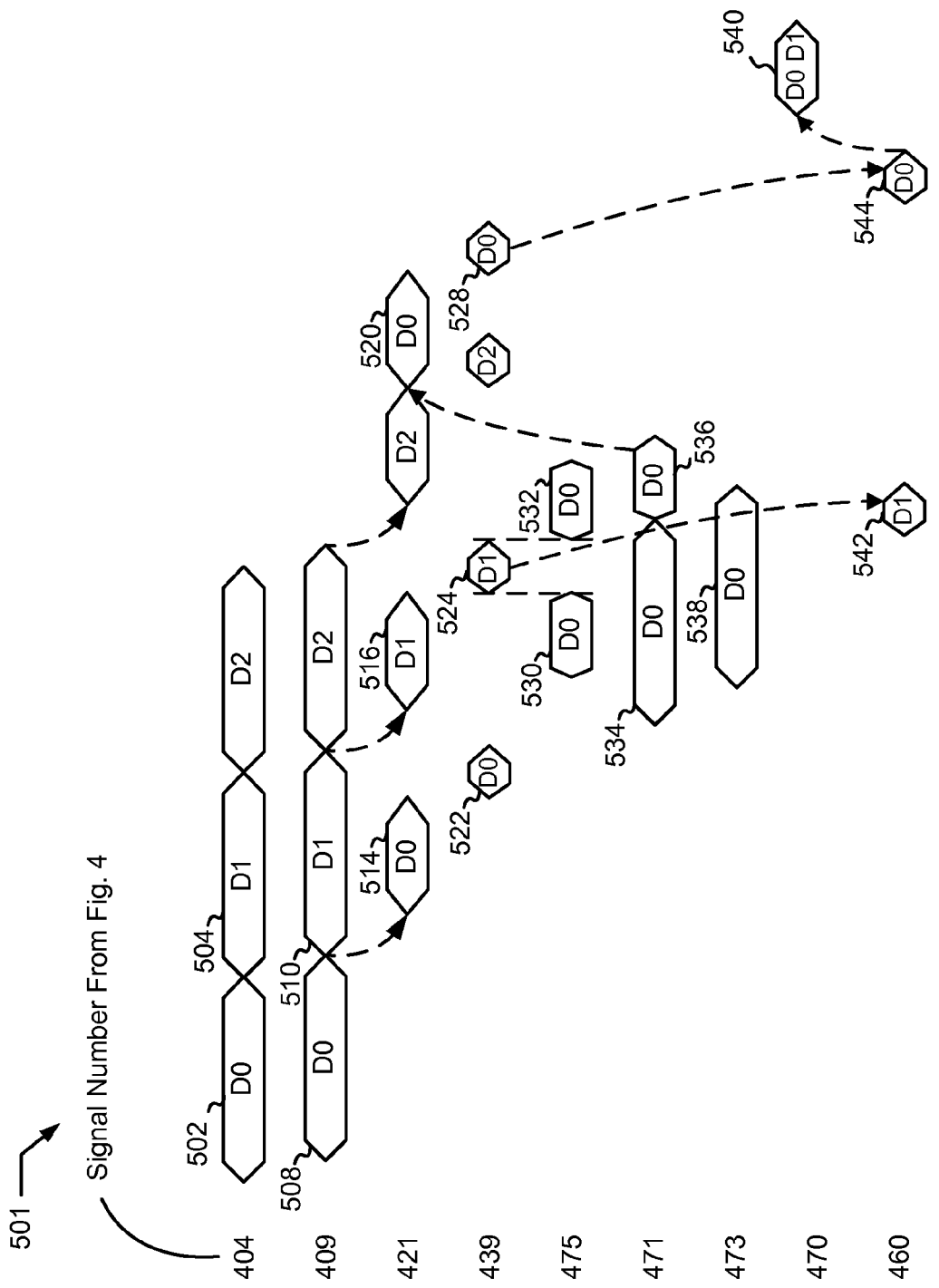

Turning to FIG. 4b, a timing diagram 501 shows an exemplary operation of queuing detection/decoding circuit 400 in accordance with one or more embodiments of the present invention. In this exemplary illustration, it is assumed that a codeword is divided into two component codewords (i.e., data sets D0 and D1 that each include two component codewords), with the first component codeword converging after two global iterations, and the second component codeword converging after a single global iteration. Following timing diagram 501, a series of data bits comprising a data set D0 are provided to channel detector 408 (designated 502). The received series of data bits is processed by channel detector 408 and output 409 is interleaved using interleaver 422 and the interleaved data is stored into one buffer of ping pong buffer 424 (designated 508). The aforementioned buffer is unloaded to LDPC decoder 436 (designated 514) via multiplexer 420, and LDPC decoder 436 provides the results to LDPC output buffer 438, and the data in LDPC output buffer 438 is transferred to unified memory 462 (designated 522). Data set D0 is not transferred to output memory buffer 460 as it has not converged.

At the same time, a subsequent series of data bits (data set D1) are provided to channel detector 408 (designated 504) and channel detector 408 processes the newly received series of bits to interleaver 422, and the interleaved data is stored to the other buffer of ping pong buffer 424 (designated 510). Again, the aforementioned buffer is unloaded to LDPC decoder 436 (designated 516), and LDPC decoder 436 provides the results to LDPC output buffer 438, and the data in LDPC output buffer 438 is transferred to unified memory 462

(designated 524). In this case, data set D1 is also transferred to output memory buffer 460 as it has converged (designated 542). Further, the location to which data set D1 was written to unified memory 462 is marked as unused freeing the location for use by a subsequent data set.

During the interim, data set D0 is retrieved from unified memory 460 (designated 534) and de-interleaved (designated 538). As the data set is de-interleaved, the de-interleaved output is loaded back into unified memory 462 (designated 530, 532). In some cases, the de-interleaved data set is loaded (designated 530, 532) back into the same location that it was originally retrieved from (designated 534). By doing so, there is no loss of performance attributable to the reduced memory when compared with the non-unified design discussed above in relation to FIG. 2. Of note, the transfer of data set D0 back to unified memory 462 is interrupted for a short period while data set D1 is written from LDPC output buffer 438 to unified memory 462 (designated 524).

After being written back to unified memory 462, data set D0 may subsequently be retrieved from unified memory 462 and transferred to LDPC input buffer 434 (designated 536). Data set D0 may then be pulled from LDPC input buffer 434 to LDPC decoder 436 where it goes through a second decoding process (designated 520). Once the decoding process is complete, data set D0 is written back to its same location in unified memory 462 (designated 528), and because it converged, it is also written to output memory buffer 460 (designated 544). As data set D0 converged, it is marked as unused in unified memory 462 freeing the location for use by a subsequent data set.

With all of the component codewords of the original codeword available in output memory buffer 460, the data sets are pulled from output memory buffer 460 and assembled in the proper order. The assembled codeword is then de-interleaved and provided as output 470 (designated 540).

Figure 5:
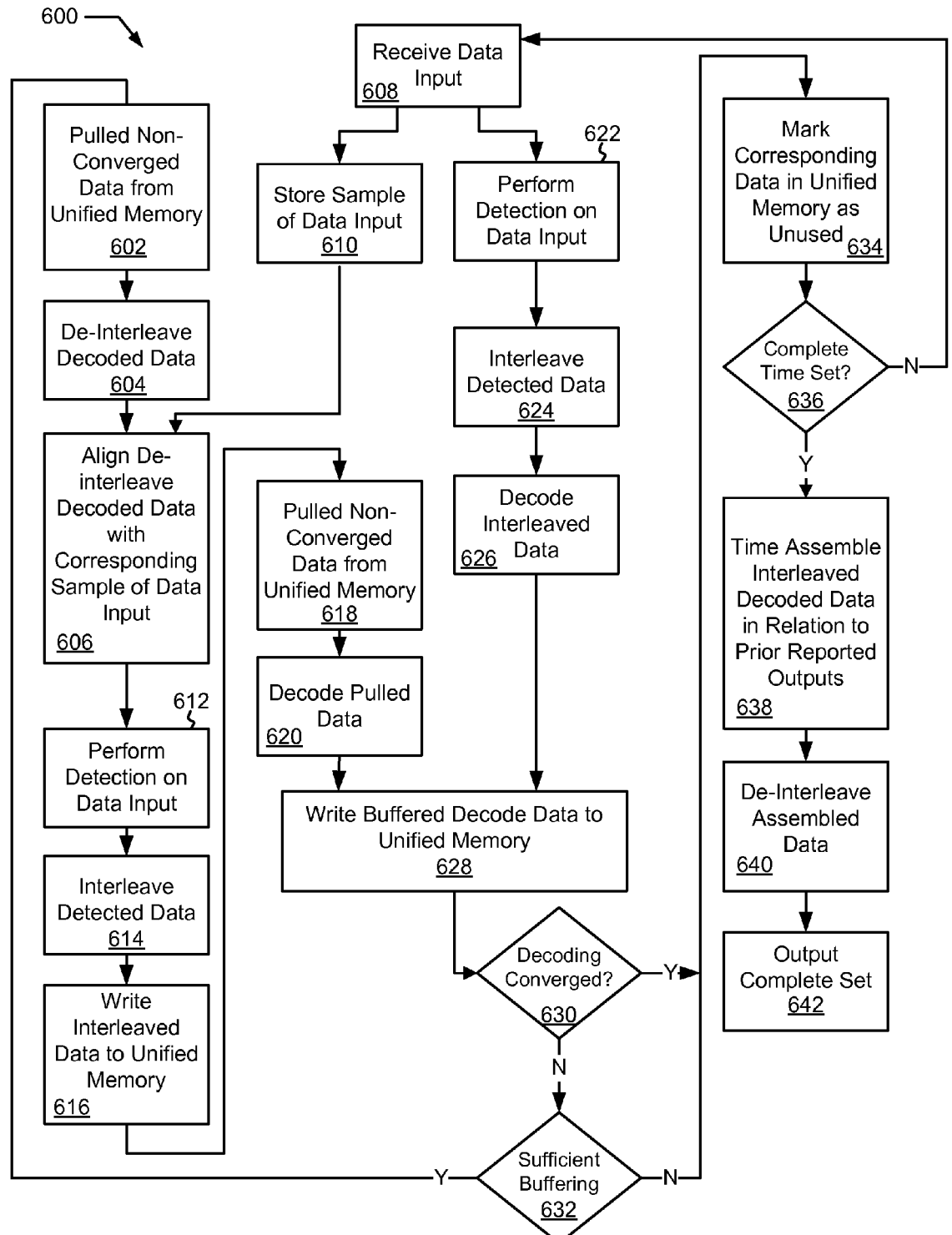
FIG. 5 is a flow diagram showing a method in accordance with some embodiments of the present invention for performing variable iterative detection and decoding processes using a unified memory.

Turning to FIG. 5, a flow diagram 600 depicts a method in accordance with some embodiments of the present invention for performing variable iterative detection and decoding processes. Following flow diagram 600, a data input is received (block 608). This data input may be, but is not limited to, a series of data bits received from a magnetic recording medium or a series of bits received from a transmission channel. Based on the disclosure provided herein, one of ordinary skill in the art will recognize a variety of sources and formats for the received data input. A sample of the received data is stored in a buffer and retained for later processing (block 610). Data detection processes are performed on the received data (block 622), the detected data is interleaved (block 624), and the interleaved data is decoded (block 626). The decoded data is then written to a unified memory (block 628). It is then determined whether the decoding process converged (block 630), and whether there is sufficient buffering available to reprocess the data (block 632).

Where either the decoding process converged (block 630) or there is insufficient buffering available (block 632), the data written to the unified memory is marked as complete and the area of the unified memory marked as unused (block 634). This allows the memory area to be used by a later data set. It is then determined if a complete time set is available in the buffer (block 636). A complete time set includes every result corresponding to received inputs over a given period of time. Thus, for example, where the first result is delayed while two later results are reported, the complete time set exists for the three results once the first result is finally available in the buffer. It should be noted that in some embodiments of the present invention that the results are reported out of order to a recipient. In such cases, there is no need to reorder results or to determine whether complete time sets are available. Where a complete time set is available (block 636), the various portions are assembled in time order (block 638), the assembled portions are de-interleaved (block 640) and the result is reported as an output (block 642). Alternatively, the data set may simply be reported as an output prior to being assembled in time and de-interleaved. This would allow for time assembling and de-interleaving by a downstream processor. Further, it would reduce the amount of memory required for output memory buffer 460.

Alternatively, where the decoding process failed to converge (block 630) and there is sufficient buffering available (block 632), the process of detection and decoding is repeated. In particular, the data set is pulled from the unified memory (block 602) and de-interleaved (block 604). The de-interleaved data is aligned with the corresponding sample of the data input (block 606) from memory buffer 412. The de-interleaved data and the corresponding sample data input are provided to the second data detector where a subsequent data detection is performed (block 612) on the originally stored sample of data input (block 610) using the soft input developed in the earlier processing of the same data input (blocks 622, 624, 626, 628). The result of the data detection process is interleaved (block 614) and the interleaved data is written back to the unified memory at the same location from which it was originally pulled (block 616).

The data set may then be retrieved from the unified memory (block 618) and decoded a subsequent time using the LDPC decoder (block 620). The resulting decoded data is written back to the unified memory at the same location from which it was originally pulled (block 628). At this point, it is determined whether the data detection and decoding process is to be repeated or whether the result is to be reported.

Figure 6A:
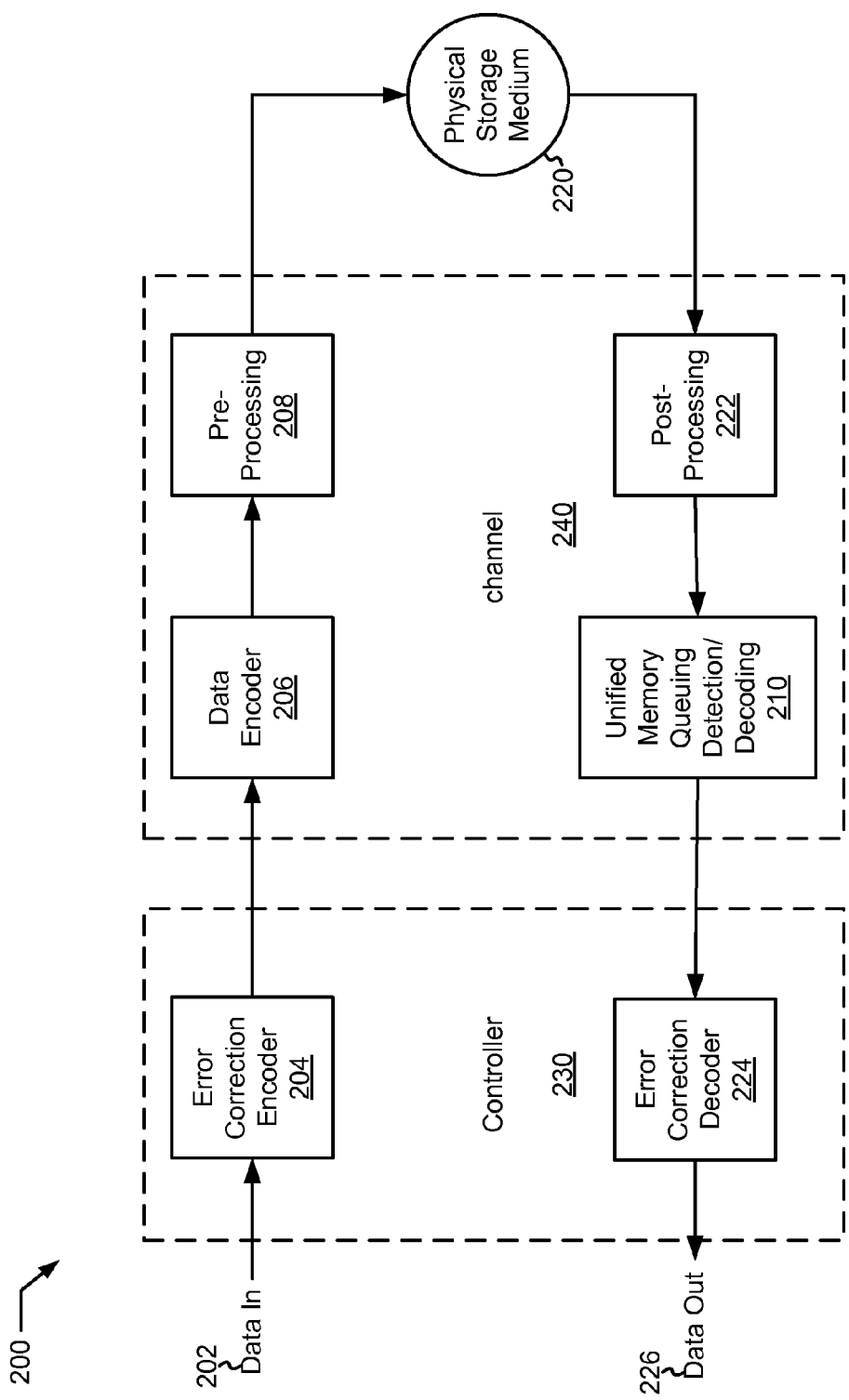
FIGS. 6a-6b depict data transfer systems using a queuing detection and decoding approach in accordance with some embodiments of the present invention.

Turning to FIG. 6*a*, a storage system 200 including a unified memory queuing detection/decoding circuit 210 is shown in accordance with some embodiments of the present invention. Storage system 200 includes a controller 230, a channel 240, and a physical storage medium 220. Physical storage medium 220 may be, but is not limited to, a magnetic disk. Based on the disclosure provided herein, one of ordinary skill in the art will recognize a variety of physical storage media that may be used in relation to different embodiments of the present invention. Controller 230 includes error correction encoding and decoding. In particular, controller 230 includes an error correction encoder 204. Error correction encoder 204 may be any error correction encoder known in the art including, but not limited to, a Reed Solomon encoder or a CRC encoder, and error correction decoder 224 may be, but is not limited to, a corresponding Reed Solomon decoder or CRC decoder. Both the aforementioned encoder and decoder may be any circuit or system known in the art that is capable of performing encoding and decoding processes. Channel 240 includes a data encoder 206 and a pre-processing circuit 208. In some cases, data encoder 206 is a Low Density Parity Check (LDPC) encoder. Based on the disclosure provided herein, one of ordinary skill in the art will recognize a variety of encoding processes and corresponding decoding processes that may be implemented in accordance with different embodiments of the present invention. Pre-processing circuit 208 includes the various pre-processing circuitry that is well known in the art. Post-processing circuit 222 includes the various post-processing circuitry that is well known in the art for receiving data from a physical storage medium and for preparing the received data for data detection and decoding.

In addition, channel 240 includes unified memory queuing detection/decoding circuit 210 that is capable of performing a variable number of detection and decoding iterations depending upon processing availability and/or convergence. Such a unified memory queuing detection/decoding circuit 210 allows for performing a variable number of iterations on a given input, while minimizing the number of iterations that must be performed. To perform this function, completion of input processing may be done out of order with the results reassembled at a later point.

In operation, a data input 202 is received. Data input 202 may be any data set destined for storage on physical storage medium 220. Data input 202 is encoded using error correction encoder 204 as is known in the art. The output of error correction encoder 204 is provided to data encoder 206 that may, for example, perform an LDPC encoding of the data. The output of data encoder 206 is provided to pre-processing circuit 208 that may convert the output from a digital output to an analog output satisfactory for writing to physical storage medium 220.

The data previously written to physical storage medium 220 may be subsequently retrieved and processed by post-processing circuit 222. In one case, post-processing circuit 222 performs an amplification of an analog data signal retrieved from physical storage medium 220, and converts the amplified analog signal to a digital signal that is output to unified memory queuing detection/decoding circuit 210. In turn, unified memory queuing detection/decoding circuit 210 performs a variable number of data detection and data decoding processes until either the output of the processes converges (i.e., it adequately represents the original data encoded by data encoder 206) or until insufficient resources remain to perform additional processing. Unified memory queuing detection/decoding circuit 210 provides its result as an output to error correction decoder 224. Error correction decoder 224 performs the designated error correction processing to determine whether any errors remain and if detected, attempts to correct the errors. Once the error correction processes are completed, error correction decoder 224 provides a data output 226. In general, data output 226 corresponds to data input 202 that was originally provided for writing to physical storage medium 220.

Figure 6B:
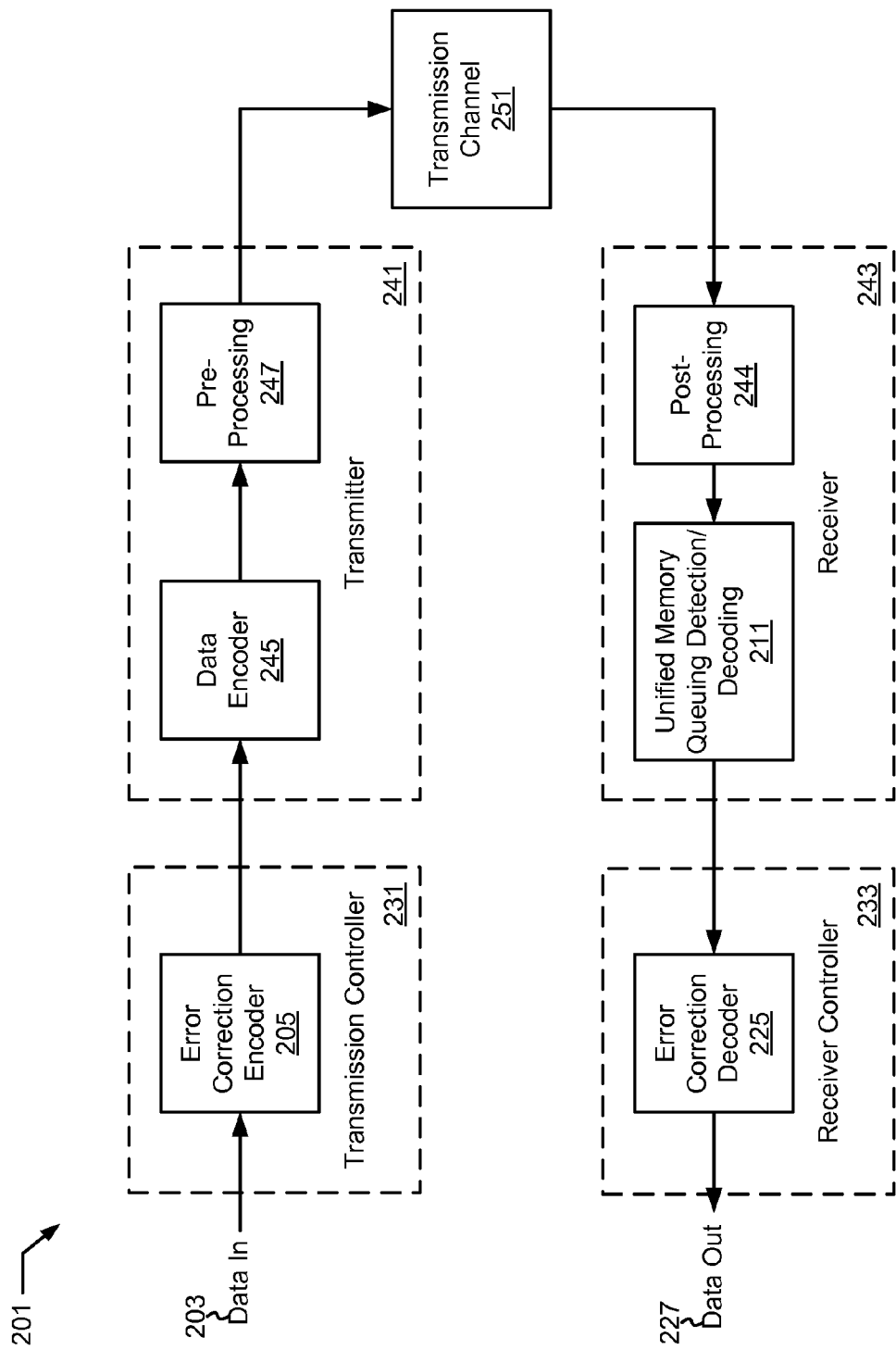

Turning to FIG. 6b, a transmission system 201 including a unified memory queuing detection/decoding circuit 211 is depicted in accordance with some embodiments of the present invention. Transmission system 201 includes a transmission controller 231, a transmitter 241, a transmission channel 251, a receiver 243, and a receiver controller 233. Transmission channel 251 may be, but is not limited to, an RF transmission channel. Based on the disclosure provided herein, one of ordinary skill in the art will recognize a variety of transmission channels that may be used in relation to different embodiments of the present invention. Transmission controller 231 includes an error correction encoder that may be implemented, for example, as a Reed Solomon encoder or a CRC encoder. Similarly, receiver controller 233 includes an error correction decoder 225 corresponding to error correction encoder 205. Thus, error correction decoder 225 may be, for example, a CRC decoder or a Reed Solomon decoder. Both the aforementioned encoder and decoder may be any circuit or system known in the art that is capable of performing encoding and decoding processes. Based on the disclosure provided herein, one of ordinary skill in the art will recognize a variety of error correction encoder/decoder approaches that may be used in relation to different embodiments of the present invention.

Transmitter 241 includes a data encoder 245 and a pre-processing circuit 247. In some cases, data encoder 245 is an LDPC encoder. Based on the disclosure provided herein, one of ordinary skill in the art will recognize a variety of encoding processes that may be implemented in accordance with different embodiments of the present invention. Pre-processing circuit 247 includes the various pre-processing circuitry that is well known in the art. In one particular case, pre-processing circuit 247 is operable to convert a digital data set from data encoder 245 to a corresponding RF signal suitable for transmission via transmission channel 251. The data set transferred via transmission channel 251 is received using a post-processing circuit 249 of receiver 243. Post-processing circuit 249 includes the various post-processing circuitry that is well known in the art for receiving data from a transmission channel and for preparing the received data for data detection and decoding.

In addition, receiver 243 includes unified memory queuing detection/decoding circuit 211 that is capable of performing a variable number of detection and decoding iterations depending upon processing availability and/or convergence. Such a unified memory queuing detection/decoding circuit 211 allows for performing a variable number of iterations on a given input, while minimizing the number of iterations that must be performed. To perform this function, completion of input processing may be done out of order with the results reassembled at a later point.

In operation, a data input 203 is received. Data input 203 may be any data set destined for transmission via transmission channel 231. Data input 203 is encoded using error correction encoder 205 as is known in the art. The output of error correction encoder 205 is provided to data encoder 245 that may, for example, perform an LDPC encoding of the data. The output of data encoder 245 is provided to pre-processing circuit 247 that may convert the output from a digital output to an analog output satisfactory for transmission via transmission channel 251.

The data transmitted via transmission channel 251 is received and processed by post-processing circuit 249 of receiver 243. In one case, post-processing circuit 249 performs an amplification of an analog data signal retrieved from transmission channel 251, and converts the amplified analog signal to a digital signal that is output to unified memory queuing detection/decoding circuit 211. In turn, unified memory queuing detection/decoding circuit 211 performs a variable number of data detection and data decoding processes until either the output of the processes converges (i.e., it adequately represents the original data encoded by data encoder 245) or until insufficient resources remain to perform additional processing. Unified memory queuing detection/decoding circuit 211 provides its result as an output to error correction decoder 225. Error correction decoder 225 performs the designated error correction processing to determine whether any errors remain and if detected, attempts to correct the errors. Once the error correction processes are completed, error correction decoder 225 provides a data output 227. In general, data output 227 corresponds to data input 203 that was originally provided for transmission via transmission channel 251.

It should be noted that while FIGS. 6a-6b depict a storage system and a transmission system to which a queuing detection/decoding circuit and/or process may be applied, that there are a variety of systems in which queuing detection/decoding circuits in accordance with different embodiments of the present invention may be applied. Based on the disclosure provided herein, one of ordinary skill in the art will recognize a variety of systems that may be benefited by use of a queuing detection/decoding circuit and/or process in accordance with different embodiments of the present invention.

In conclusion, the invention provides novel systems, devices, methods and arrangements for performing iterative data decoding and/or detection. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscribe line systems. Therefore, the above description should not be taken as limiting the scope of the invention, which is defined by the appended claims.

What is claimed is:

1. A variable iteration data processing system, the system comprising:
   a first detector;
   a second detector;
   a decoder;
   a unified memory buffer; and
   wherein the first detector is operable to perform a data detection on an input data set and to provide a first detected data set, wherein the decoder is operable to receive a derivative of the first detected data set and to provide a decoded data set, wherein the unified memory buffer is operable to receive the decoded data set and to provide the decoded data set to the second detector, wherein the second detector is operable to perform a data detection on a derivative of the decoded data set and to provide a second detected data set, and wherein the unified memory buffer is operable to receive a derivative of the second detected data set.

2. The system of claim 1, wherein the unified memory buffer is further operable to provide the derivative of the second detected data set to the decoder.

3. The system of claim 2, wherein the derivative of the second detected data set is provided to the decoder via an input buffer and a multiplexer.

4. The system of claim 3, wherein the system further includes:
   an interleaver, wherein the interleaver is operable to receive the first detected data set and to provide the derivative of the first detected data set to the decoder via the multiplexer.

5. The system of claim 1, wherein the system further includes:
   a first interleaver, wherein the first interleaver receives the first detected data set and provides the derivative of the first detected data set;
   a second interleaver, wherein the second interleaver receives the second detected data set and provides the derivative of the second detected data set; and
   a de-interleaver, wherein the de-interleaver receives the first decoded data set and provides the derivative of the first decoded data set to the second detector.

6. The system of claim 5, wherein the second detector only receives the derivative of the first decoded data set when the first decoded data set fails to converge.

7. The system of claim 1, wherein the system further includes:
   an output buffer, and wherein the decoder is operable to provide the decoded data set to the output buffer when the decoded data set converges.

8. The system of claim 7, wherein the system further includes:
   a de-interleaver, and wherein the de-interleaver is operable to receive the decoded data set from the output buffer and to de-interleave the decoded data set.

9. The system of claim 7, wherein the output of the decoder includes both a hard output and a soft output, and wherein the output buffer receives only the hard output.

10. The system of claim 1, wherein the system further includes an input data buffer, wherein the input data buffer receives the input data set, and wherein the input data buffer provides the input data set to the second detector simultaneous to the second detector receiving the derivative of the first decoded data set.

11. The system of claim 1, wherein the location in the unified memory buffer from where the first decoded data set is read is the same location to which the derivative of the second detected data set is written.

12. The system of claim 1, wherein the system is incorporated in a device selected from a group consisting of: a storage device, and a communication device.

13. The system of claim 1, wherein the system is implemented as part of an integrated circuit.

14. A method for processing a data input, the method comprising:
   providing a first detector and a second detector;
   performing a data detection on an input data set using the first detector, wherein a first detected data set is generated;
   interleaving the first detected data set, wherein a first interleaved data set is generated;
   decoding the first interleaved data set, wherein a decoded data set is generated;
   writing the decoded data set to a unified memory buffer;
   accessing the decoded data set from the unified memory buffer;
   de-interleaving the decoded data set, wherein a de-interleaved data set is generated;
   performing a data detection on the de-interleaved data set using the second detector, wherein a second detected data set is generated; and
   interleaving the second detected data set, wherein a second interleaved data set is generated; and
   writing the second interleaved data set to the unified memory buffer.

15. The method of claim 14, wherein writing the second interleaved data set to the unified memory buffer includes writing the second interleaved data set to the same location that the decoded data set was written to in the unified memory buffer.

16. The method of claim 14, wherein the decoded data set is a first decoded data set, and wherein the method further includes:
   decoding the second interleaved data set, wherein a second decoded data set is generated;
   determining whether the second decoded data set converged; and
   based at least in part on said determination of convergence, providing at least a portion of the second decoded data set to an output buffer.

17. The method of claim 14, wherein the decoded data set is a first decoded data set, wherein the de-interleaved data set is a first de-interleaved data set, and wherein the method further includes:
   decoding the second interleaved data set, wherein a second decoded data set is generated;
   determining whether the second decoded data set converged;

writing the second decoded data set to the unified memory buffer;

de-interleaving the second decoded data set, wherein a second de-interleaved data set is generated;

performing a data detection on the second de-interleaved data set, wherein a third detected data set is generated;

interleaving the third detected data set, wherein a third interleaved data set is generated; and writing the third interleaved data set to the unified memory buffer.

18. The method of claim 17, wherein the third interleaved data set is written to the same location in the unified memory buffer that the first decoded data set was written.

19. A data transfer system including a receiver, the system comprising:

an input signal;

a receiver, wherein the receiver receives the input signal, and wherein the receiver includes a unified memory queuing detection/decoding that includes:
 a first detector;
 a second detector;
 a decoder;
 a unified memory buffer; and
 wherein the first detector is operable to perform a data detection on an input data set and to provide a first detected data set, wherein the decoder is operable to receive a derivative of the first detected data set and to provide a first decoded data set, wherein the unified memory buffer is operable to receive the first decoded data set and to provide the first decoded data set to the second detector, wherein the second detector is operable to perform a data detection on a derivative of the first decoded data set and to provide a second detected data set, and wherein the unified memory buffer is operable to receive a derivative of the second detected data set.

20. The system of claim 19, wherein the input signal is derived from a signal transmitted by a transmitter to the receiver via a transfer medium, wherein the system is a hard disk drive system, and wherein the transfer medium is a magnetic storage medium.

21. The system of claim 19, wherein the input signal is derived from a signal transmitted by a transmitter to the receiver via a transfer medium, wherein the system is a wireless communication system, and wherein the transfer medium is a wireless transmission channel.

22. The system of claim 19, wherein the system is incorporated in a device selected from a group consisting of: a storage device and a communication device.

23. A data processing system, the system comprising:
a first detector circuit;
a second detector circuit;
a decoder circuit;
a memory buffer; and wherein the first detector circuit is operable to apply a first data detection algorithm to an input data set to yield a first detected data set, wherein the decoder circuit is operable to apply a data decode algorithm to data set derived from the first detected data set to yield a decoded data set, wherein the memory buffer is operable to store the decoded data set and to provide the decoded data set to the second detector circuit, wherein the second detector circuit is operable to apply a second data detection algorithm to the input data set guided by a data set derived from the decoded data set to yield a second detected data set, and wherein the memory buffer is operable to store a data set derived from the second detected data set.

24. The system of claim 23, wherein the first data detection algorithm and the second data detection algorithm are selected from a group consisting of: Viterbi algorithm, and a maximum a posteriori algorithm.

25. The system of claim 23, wherein the data decode algorithm is a low density parity check algorithm.

26. The system of claim 23, wherein the memory buffer is further operable to provide the derivative of the second detected data set to the decoder.

27. The system of claim 26, wherein the data set derived from the second detected data set is provided to the decoder via an input buffer and a multiplexer.

28. The system of claim 27, wherein the system further includes: an interleaver operable to receive the first detected data set and to provide the data set derived from the first detected data set to the decoder via the multiplexer.

29. The system of claim 23, wherein the system further includes:
a first interleaver operable to shuffle the first detected data set to yield the data set derived from the first detected data set;
a second interleaver operable to shuffle the second detected data set to yield the data set derived from the second detected data set; and
a de-interleaver operable to de-shuffle first decoded data set to yield the data set derived from the first decoded data set.

30. The system of claim 23, wherein the location in the memory buffer from where the first decoded data set is read is the same location to which the data set derived from the second detected data set is written.

31. The system of claim 23, wherein the system is incorporated in a device selected from a group consisting of: a storage device and a communication device.

32. The system of claim 23, wherein the system is implemented as part of an integrated circuit.

33. The system of claim 23, wherein the first data detection algorithm and the second data detection algorithm are the same algorithm.

* * * * *